US011878192B2

(12) United States Patent
Reed

(10) Patent No.: US 11,878,192 B2
(45) Date of Patent: Jan. 23, 2024

(54) FIRE OR SMOKE CURTAIN

(71) Applicant: Coopers Fire Limited, Waterlooville (GB)

(72) Inventor: James Martin Reed, Hampshire (GB)

(73) Assignee: Coopers Fire Limited, Waterlooville (GB)

(*) Notice: Subject to any disclaimer, the term of this patent is extended or adjusted under 35 U.S.C. 154(b) by 490 days.

(21) Appl. No.: 17/270,917

(22) PCT Filed: Aug. 20, 2019

(86) PCT No.: PCT/GB2019/052326
§ 371 (c)(1),
(2) Date: Feb. 24, 2021

(87) PCT Pub. No.: WO2020/039176
PCT Pub. Date: Feb. 27, 2020

(65) Prior Publication Data
US 2021/0331009 A1 Oct. 28, 2021

(30) Foreign Application Priority Data
Aug. 24, 2018 (GB) ..................................... 1813859

(51) Int. Cl.
*A62C 2/10* (2006.01)
*E06B 9/13* (2006.01)

(52) U.S. Cl.
CPC . *A62C 2/10* (2013.01); *E06B 9/13* (2013.01)

(58) Field of Classification Search
CPC ........... A62C 2/06; A62C 2/10; A62C 3/0257; E06B 9/08; E06B 9/13; E04B 1/94
USPC ..................................... 169/48, 49; 160/180
See application file for complete search history.

(56) References Cited

U.S. PATENT DOCUMENTS

| | | | | | |
|---|---|---|---|---|---|
| 3,583,465 | A * | 6/1971 | Youngs | A47G 5/02 | 160/243 |
| 4,874,028 | A * | 10/1989 | Lynch | A47H 99/00 | 160/332 |
| 5,188,186 | A * | 2/1993 | Nash | B29C 44/181 | 169/48 |
| 6,962,188 | B2 * | 11/2005 | Coenraets | E06B 9/13 | 160/180 |
| 9,956,442 | B2 * | 5/2018 | Cooper | E06B 5/00 | |
| 2009/0008039 | A1 | 1/2009 | Lambridis | | |

FOREIGN PATENT DOCUMENTS

| | | |
|---|---|---|
| CN | 206426811 U | 8/2017 |
| JP | H10 211295 A | 8/1998 |

(Continued)

OTHER PUBLICATIONS

International Search Report, European Patent Office, dated Dec. 10, 2019.

(Continued)

*Primary Examiner* — Steven J Ganey
(74) *Attorney, Agent, or Firm* — Bay State IP, LLC

(57) ABSTRACT

A fire or smoke curtain comprising ng a plurality of panels (4$_1$, 4$_2$, 4$_3$) of fire curtain material. The panels are arranged to overlap at their edges (7) when the curtain is deployed. Each over-lapping edge has a metallic reinforcing strip (12) that are incorporated with the panels having the said edge along the latter.

15 Claims, 2 Drawing Sheets

(56) References Cited

FOREIGN PATENT DOCUMENTS

Figure 1:
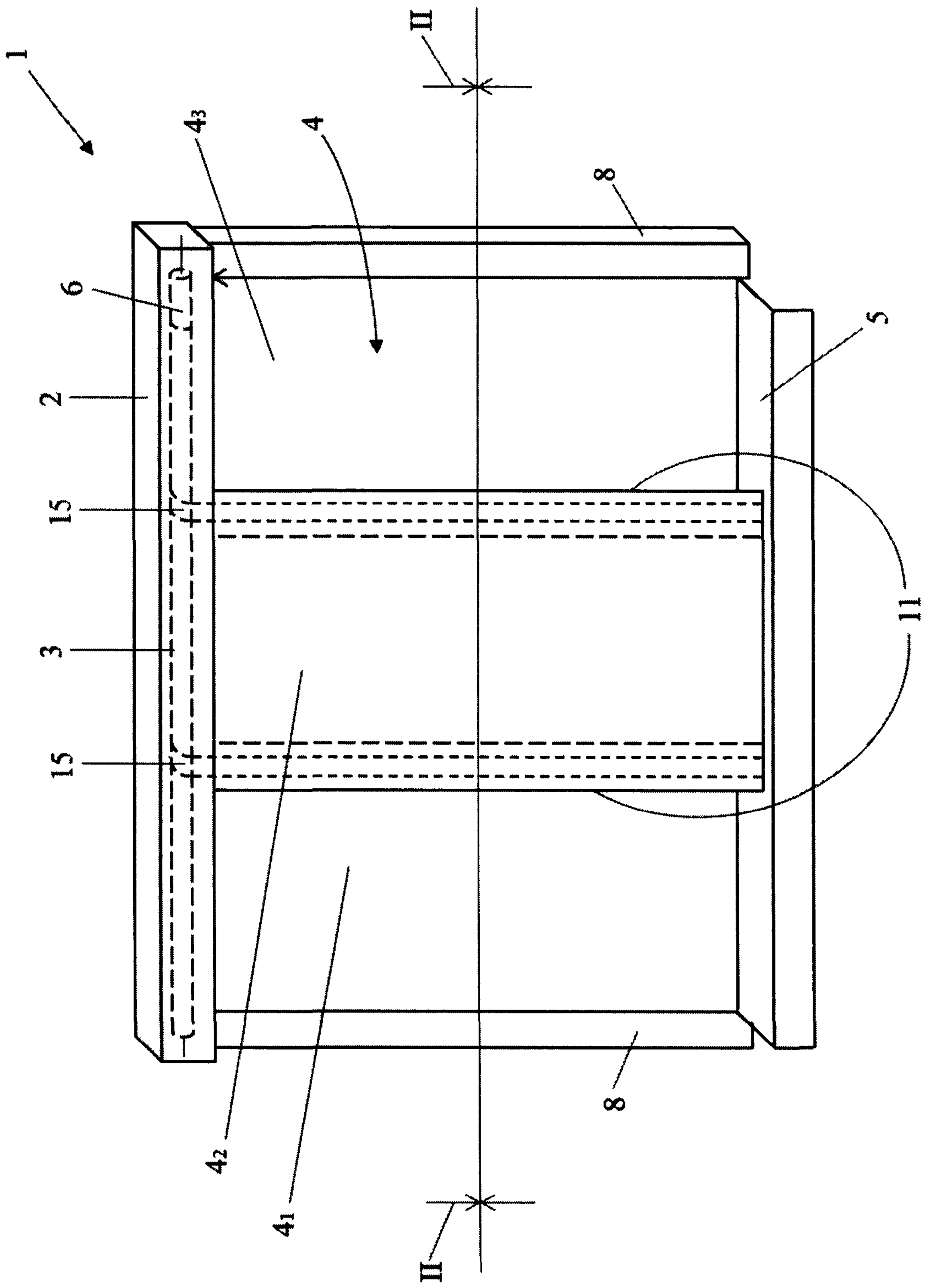

| | | |
|---|---|---|
| JP | 2001129107 A | 5/2001 |
| JP | 2002102375 A | 4/2002 |

OTHER PUBLICATIONS

Written Opinion of the International Searching Authority, European Patent Office, dated Dec. 10, 2019.
International Preliminary Report on Patentability, European Patent Office, dated Dec. 18, 2020.
Notification of Reasons for Refusal with English Translation, Japanese Patent Office, dated Sep. 5, 2023.

* cited by examiner

FIRE OR SMOKE CURTAIN

CROSS REFERENCE TO RELATED APPLICATION

This application is for entry into the U.S. National Phase under § 371 for International Application No. PCT/GB2019/052326 having an international filing date of Aug. 20, 2019, and from which priority is claimed under all applicable sections of Title 35 of the United States Code including, but not limited to, Sections 120, 363, and 365(c), and which in turn claims priority under 35 USC 119 to Great Britain Patent Application No. 1813859.4 filed on Aug. 24, 2018.

The present invention relates to a fire or smoke curtain, that is a curtain deployable as part of a fire or smoke barrier, generally deployed to isolate one part of a building from another in the event of fire or smoke in the one part to stop or delay spread of fire or smoke to other parts.

In many such barriers, the curtain as such is stored on a roller, from which it is deployed under gravity by unrolling from the roller. For a wide curtain, it is known to arrange more than one curtain drop or panel on the roller, the panels overlapping at edges to provide the smoke and fire isolation. Such panels can be deployed from a single roller, on which they are rolled with their edges overlapping. Alternatively they can be rolled on a pair of adjacent rollers with respective edges rolled opposite each other.

The curtain is likely to be provided with panels not only because of narrower panel width assists ease of deployment and re-rolling, but also in a situation where the building opening is to be closed in event of fire is wide, there are likely to be more users of the building, with the concomitant increase in the possibility of persons be the wrong side of the curtain when it is deployed. Panels separable at their edges allow an escape route.

The efficacy of such a curtain depends on the overlaps remaining in contact in the event of a fire. However, the curtain as a whole and its edges in particular are liable to lose tautness when hot.

The object of the present invention is to provide fire or smoke curtain

According to the invention there is provided a fire or smoke curtain comprising:

- a plurality of panels of fire curtain material, the panels being arranged to overlap at edges when deployed, each over-lapping edge having:
- a metallic reinforcing strip incorporated with the panel having the said edge along the latter.

The reinforcing strip can be stitched onto its panel, with stitching through both. However it is preferably freely accommodated in a hem formed by turning back and stitching the curtain material. Alternatively, each strip could be accommodated in a separate lay-flat tube of fire curtain material, itself stitched to the edge. The hem or the tube can provide those portions of the panels which overlap. Alternatively the extent of the overlap can be greater. In other words, the strips can overlap each other or more-set-in regions of the panels. This greater degree of overlap results in less thickness of curtain material and strips when the curtain is rolled on a roller in a complete fire barrier.

The strips are conveniently attached to the roller, as by riveting, at the top of the panels hem. They can additionally be attached to a bottom bar at the bottom.

Where the panel is an edge one, its edge opposite from the strip can be provided with studs for engaging in an edge guide of the curtain. Where the panel is a middle one, both of its edges can be provided with a metal strip.

Preferably the metallic strip is of stainless steel, conveniently between 0.1 mm and 0.5 mm thick. Conveniently it is between 10 and 50 mm wide.

Figure 2:
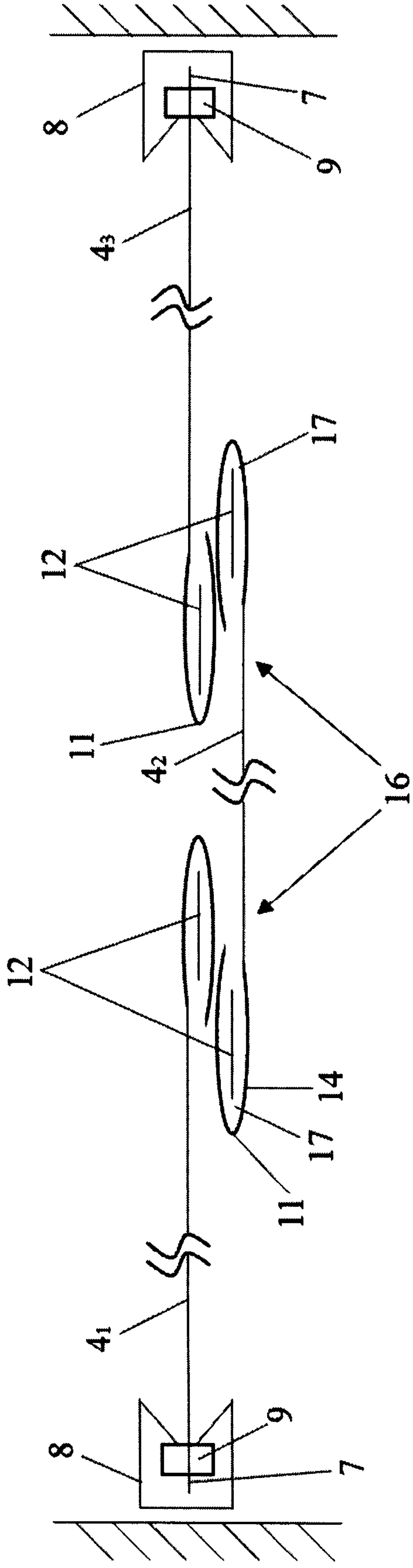

To help understanding of the invention, a specific embodiment thereof will now be described by way of example and with reference to the accompanying drawings, in which:

FIG. 1 is a perspective view of a fire barrier having a fire curtain in accordance with the invention and FIG. 2 is a cross-section on the line II-II through the curtain of FIG. 1.

Referring to the drawings, a fire barrier 1 has a head-box 2 with a roller 3 journalled in it for deployment and withdrawal of a fire curtain 4, the curtain deploying by weight of a bottom bar 5 unrolling the curtain and withdrawing by rolling up by action of a motor 6 at one end of the roller. The edges 7 of the curtain engage in side guides 8, where they are retained by a plurality of studs 9 fastened to the curtain and slidingly accommodated in the side guides. In these respects and indeed in the fact that curtain is comprised of a number of panels $\mathbf{4}_1$, $\mathbf{4}_2$, $\mathbf{4}_3$, the barrier is conventional.

In accordance with the invention, the curtain panels have at their vertical, when deployed, edges 11, other than the studded edges 7, stainless steel strips 12 in hems 14. The hems are formed by turning back and stitching the fire curtain material of the panels. The stitching can be with stainless steel and/or Kevlar threads. The fire curtain material can be of the type supplied by ourselves.

The strips are riveted at their tops to the roller 3 by rivets 15. Their bottom ends extend to just above the bottom bar, when deployed. They are not fixed to the bottom bar, allowing the bar to hold the curtain taut by its weight acting on the curtain material.

The panels overlap at the strips to such extent that the strips do not themselves overlap, but overlap with panel regions 16 inwards of the strips and hems whereby the strips are not rolled on top of each other, avoiding unnecessary thickening of the rolled curtain on the roller at the strips.

The invention is not intended to be restricted to the details of the above described embodiment, in which the pockets 17 formed by the turned back hems are wide enough merely to accommodate the strips. The hems could be wider to provide the over-lap regions at the very edges of the curtain panels, outwards of the stainless steel strips. Conveniently this is arranged by the hems being for instance three times the width of the strips and the strip being restricted to the inner extent of the hems, with the outer extents providing the overlap regions. In this way, the strips still stiffen the curtains at their edges, but are not overlapped with neighbouring panels when wound on the roller.

The invention claimed is:

1. A fire or smoke curtain comprising:

- a plurality of panels of fire curtain material, the panels being arranged to overlap at edges when deployed, each over-lapping edge having:
- a metallic reinforcing strip incorporated with the panel having the said edge along the latter, wherein the panels overlap to an extent when deployed that the metallic reinforcing strips of the overlapping edges of adjacent panels do not overlap each other.

2. A fire or smoke curtain according to claim 1, wherein where a panel is an edge one of the curtain, its edge opposite from its metallic reinforcing strip is provided with studs for engaging in a side guide for the curtain.

3. A fire or smoke curtain according to claim 1, wherein the panel is a middle one, both of its edges are provided with a metallic reinforcing strip.

4. A fire or smoke curtain according to claim 1, wherein each reinforcing strip is stitched onto its panel.

5. A fire or smoke curtain according to claim 1, wherein each metallic reinforcing strip is freely accommodated in a hem formed by turning back and stitching the curtain material.

6. A fire or smoke curtain according to claim 5, wherein each hem or each tube provide a respective said over-lapping panel edge.

7. A fire or smoke curtain according to claim 6, wherein each over-lapping panel edge is wider than its metallic reinforcing strip outwardly thereof for less thickness in the curtain.

8. A fire or smoke curtain according to claim 6, wherein the strip is restricted to the inner extent of the hem with outer extents providing overlap regions.

9. A fire or smoke curtain according to claim 1, wherein each reinforcing strip is accommodated in a separate lay-flat tube of fire curtain material which is stitched to the edge of its panel.

10. A fire or smoke barrier according to claim 1, wherein each metallic reinforcing strip is between 0.1 mm and 0.5 mm thick, and between 10 mm and 50 mm wide and is of stainless steel.

11. A fire or smoke barrier as claims in claim 10, wherein the metallic reinforcing strips are attached to the roller by riveting at the top of the panel's hem.

12. A fire or smoke barrier according to claim 11, wherein the strips are attached to the bottom bar at the bottom of the curtain.

13. A fire or smoke barrier according to claim 11, wherein bottom ends of the metallic reinforcing strips extend to just above the bottom bar, when deployed, without fixture to the bottom bar, allowing the bar to hold the curtain taut by its weight acting on the curtain material.

14. A fire or smoke barrier according to claim 10, wherein the curtain deploys from the headbox under the weight of a bottom bar and is withdrawable into the same via a motor at one end of the roller.

15. A fire or smoke barrier comprising a curtain according to claim 1, wherein the curtain is held, rolled around a roller when not in use, the roller being journalled in a headbox.

* * * * *